United States Patent [19]

Gillis et al.

[11] Patent Number: 5,115,045
[45] Date of Patent: May 19, 1992

[54] ISOCYANATE REACTIVE COMPOSITIONS

[75] Inventors: Herbert R. Gillis, Sterling Heights, Mich.; Malcolm Hannaby, Sterrebeek, Belgium

[73] Assignee: Imperial Chemical Industries PLC, London, England

[21] Appl. No.: 671,565

[22] Filed: Mar. 19, 1991

Related U.S. Application Data

[63] Continuation-in-part of Ser. No. 487,698, Mar. 1, 1990, abandoned.

[30] Foreign Application Priority Data

Mar. 13, 1989 [GB] United Kingdom ............... 8905768

[51] Int. Cl.$^5$ ............................................. C08G 18/32
[52] U.S. Cl. .................................... 525/420; 525/424; 525/435; 525/436; 528/68; 528/76; 528/77; 528/78; 528/81; 528/83; 252/182.26
[58] Field of Search .............. 525/420, 424, 435, 436; 528/68, 76, 77, 78, 81, 83; 252/182.26

[56] References Cited

U.S. PATENT DOCUMENTS 2,888,439 5/1959 Simons ................................ 528/76

Primary Examiner—Maurice J. Welsh

[57] ABSTRACT

An isocyanate-reactive composition comprising the reaction product of:

a) an organic compound having the formula:

$$Q-[X-COY]_n$$

or $$Q-[X-CO-R-(COY)_m]_n$$

wherein Q represents an organic residue, X represents oxygen or sulphur, Y represents a halogen atom or an aryloxy group, R is a polyvalent hydrocarbon radical, m is a whole number from 1 to 3 and n is a whole number of at least 2, and b) a polyfunctional compound which is capable of reacting with reactant (a) and contains at least one imino or enamino group.

13 Claims, No Drawings

ISOCYANATE REACTIVE COMPOSITIONS

This is a continuation-in-part of copending application Ser. No. 07/487,698 filed on Mar. 1, 1990 now abandoned.

This invention relates to compositions of matter and more particularly to isocyanate-reactive compositions, to their preparation and to their use in the production of useful polymeric materials.

The manufacture of useful polymeric materials by reacting organic polyisocyanates with compounds containing a plurality of isocyanate-reactive groups is well established. Thus, polyurethane materials, which may take the form of adhesives, coatings, elastomers, fibres, films, foams, thermoplastics and the like are produced on a large scale by reacting polyisocyanates with low and/or high molecular weight polyols, for example polyoxypropylene polyols. Other isocyanate-reactive materials used include polyether polyamines obtained by the amination of the polyoxypropylene polyols. The polyamines are useful in the manufacture of high grade polyurea elastomers by the reaction injection moulding (RIM) process but are costly to make. Other valuable isocyanate-reactive materials include the imino-functional compounds described in U.S. Pat. No. 4,794,129 but since many of these are prepared from the aforementioned polyamines, cost is again a disincentive.

The present invention is concerned with isocyanate-reactive compositions which contain imino- and/or enamino functional groups and which are obtainable by relatively low cost methods. Thus, according to the invention, there is provided an isocyanate-reactive composition comprising the reaction product of:

(a) an organic compound having the formula:

$$Q-[X-COY]_n$$

or $$Q-[X-CO-R-(COY)_m]_n$$

wherein Q represents an organic residue, X represents oxygen or sulphur, Y represents a halogen atom or an aryloxy group, R is a polyvalent hydrocarbon radical m is a whole number from 1 to 3 and n is a whole number of at least 2, and (b) a polyfunctional compound which is capable of reacting with reactant (a) and contains at least one imino or enamino group.

For reactant (a), it is preferred that X is oxygen and Y is chlorine although Y can be any of the other halogens. Aryloxy groups which may be represented by Y include phenoxy and substituted phenoxy groups The polyvalent hydrocarbon radical represented by R may be aliphatic, cycloaliphatic, aromatic or araliphatic and is preferably divalent or trivalent. The organic residue represented by Q is a polyvalent hydrocarbon residue which may optionally contain heteroatoms in the form, for example, of one or more ether, thioether, ester, thioester or amide groups.

Examples of organic compounds which may be employed as reactant (a) include acid chlorides such as may be obtained by reacting a carboxy terminated polyester with, for example, thionyl chloride.

It is preferred, however, that reactant (a) is the reaction product of a polyol or polythiol $Q(XH)_n$ having an average molecular weight of from about 100 to about 12,000 and an hydroxyl and/or thiol functionality of from about 2 to about 6, and an acylating agent of the formula:

$$COY_2$$

or $$R-(COY)_{m+1}$$

wherein Y, R and m have the meanings given above.

Polyols and polythiols which may be used in the preparation of reactant (a) preferably have hydroxyl functionalities of from 2 to 4. The polyols and polythiols may be of the types which find use as chain extenders or crosslinkers having molecular weights of, for example, from about 100 to about 1500 or they may be of the types which have been proposed as softblock components having molecular weights of, for example, from about 1500 to about 8000.

Polyols are preferred to polythiols, especially polyols in which the hydroxyl groups are directly attached to aliphatic carbon atoms. Suitable polyols and methods for their preparation have been fully described in the prior art and, as examples of such polyols, there may be mentioned non-polymeric polyols, for example diethylene glycol, 1,6-hexanediol, cyclohexane dimethanol, bisphenol A, trimethylolpropane and pentaerythritol as well as polymeric polyols such as polyethers, polyesters, polyether-esters, polyesteramides, polythioethers, polycarbonates, polyacetals, polyolefins and polysiloxanes.

The preferred polymeric polyols are polyesters, polyether-esters and, especially, polyethers.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds containing a plurality of active hydrogen atoms have been described in the prior art and include water and polyols, for example ethylene glycol, propylene glycol, diethylene glycol, cyclohexane dimethanol, resorcinol, bisphenol A, glycerol, trimethylolpropane, 1,2,6-hexanetriol, pentaerythritol, and amines, for example ammonia, ethylamine, methylamine, ethylene diamine, hexamethylenediamine, piperazine, diaminodiphenylmethane, diethylene triamine, ethanolamine, and the like. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other particularly useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and poly(isobutylene)polyols. Suitable polysiloxane polyols include polydimethylsiloxane and polydiphenylsiloxane diols and triols.

Mixtures of polyols may be used. Such mixtures may contain components differing in respect of molecular weight, functionality and/or the chemical nature of the polymer backbone. Similarly, corresponding polythiols or polythiol mixtures may be used or mixtures of one or more polyols with one or more polythiols.

Acylating agents which may be reacted with polyols and/or polythiols to form reactant (a) include carbonyl dihalides, aryl haloformates, diaryl carbonates and the halides and aryl esters of polycarboxylic acids.

Preferred acylating agents comprise the carbonyl dihalides, especially phosgene. Other particularly useful acylating agents include dicarboxylic and/or tricarboxylic acid halides, especially chlorides, having boiling points not exceeding 350° C. at atmospheric pressure.

Reactant (a) may be formed by reacting the polyol or polythiol with the acylating agent under conventional acylation conditions. Thus, for example, a poly(chloroformate) may be formed by reacting a polyol, for example a polyether polyol such as a polyoxypropylene polyol, with phosgene, optionally in excess, and then removing the hydrogen chloride produced and any excess phosgene by sparging with dry nitrogen. Similarly, a poly(acid chloride) may be prepared by reacting a polyol with a volatile polycarboxylic acid chloride, optionally in excess, and then removing the hydrogen chloride by sparging with dry nitrogen. Unreacted polycarboxylic acid chloride may then be removed by distillation, preferably carried out under reduced pressure at a temperature below 250° C. These reactions have been fully described in the prior art.

Reactant (b) may be a mono-imine or mono-enamine but is preferably a compound containing two or more functional groups per molecule selected from hydroxyl, thiol, primary amino, secondary amino, carboxy, imino and enamino groups, at least one of said functional groups being an imino or enamino group.

Especially useful polyfunctional compounds have active hydrogen-containing and/or isocyanate-reactive groups of dissimilar reactivity, that is to say one of the groups is more reactive towards reactant (a) than another of said groups. As examples of such compounds, there may be mentioned compounds containing one or more imino and/or enamino groups and at least one group that is more reactive than imino or enamino groups towards reactant (a), in particular such compounds may contain :

1) an amino, especially secondary amino, group and one or more enamino or hydrolytically stable iminofunctional, for example compounds having the formulae :

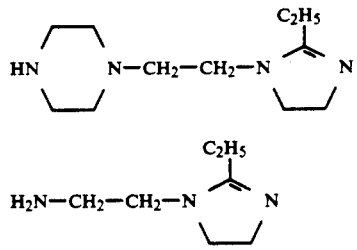

or 2) an amino, especially secondary amino group and one or more hydrolysable imino functional groups, for example compounds having the formulae:

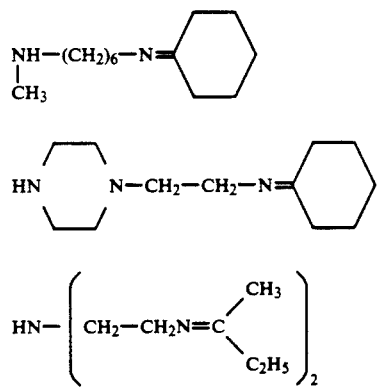

The use of symmetrical polyfunctional compounds having groups of equal reactivity, for example di-imines or di-enamines, is not excluded, however, and compounds containing both imino and enamino functionality in the same molecule may be used. Mixtures of polyfunctional compounds may be used if desired.

Reaction products of a reactant a) and a reactant b) of class 2 hereabove, are of particular interest in that such products may be hydrolysed to amine ended materials with desirable new properties.

A further object of the present invention is therefore to provide a new class of chemical compounds, which result from the hydrolysis of the reaction product of :

(a) an organic compound having the formula :

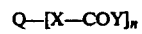

or

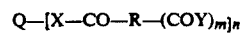

wherein Q represents an organic residue, X represents oxygen or sulphur, Y represents a halogen atom or an aryloxy group, R is a polyvalent hydrocarbon radical, m is a whole number from 1 to 3 and n is a whole number of at least 2, and b) a polyfunctional compound containing an amine group and at least one hydrolysable imino group.

The polyamines obtained by the aforementioned hydrolysis are themselves isocyanate-reactive and may be used alone or in conjunction with other isocyanate-reactive materials in the production of polyurea plastics.

The imines or imino-functional compounds referred to herein are compounds which contain at least one isocyanate-reactive imino group per molecule and conform to the general structure:

$$\begin{array}{c} U \\ \phantom{U}\diagdown \\ \phantom{UU}C=N-Z \\ \phantom{U}\diagup \\ V \end{array}$$

wherein U, V and Z are chemical moieties which collectively form the rest of said compound and are each independently selected from hydrogen and organic radicals which are attached to the imino unit:

C=N— of said compound through N, C, O, S, Si or P, the central carbon atom of said imino unit being bonded to three atoms.

In the above structure, neither the carbon nor the nitrogen atom of the imino unit should be incorporated within an aromatic or other fully conjugated ring or ring system. It is preferred that Z is attached to the imino unit through carbon and that U and V are independently H or organic radicals attached through C, N or O. It is most preferred that U, V and Z are attached through saturated atoms, preferably aliphatic carbon atoms.

Many types of imino-functional compounds are useful in this invention as reactant (b) including, but not limited to, those listed in Table A, following:

TABLE A

| | TYPE | |
|---|---|---|
| ⓟ | $-R^5-C=N-R^7$ <br> $\phantom{-R^5-}|$ <br> $\phantom{-R^5-}R^6$ | Simple imine |
| ⓟ | $-R^5-O-C=N-R^7$ <br> $\phantom{-R^5-O-}|$ <br> $\phantom{-R^5-O-}R^6$ | Imino ester |
| ⓟ | $-Ar-O-C=N-R^7$ <br> $\phantom{-Ar-O-}|$ <br> $\phantom{-Ar-O-}R^6$ | Imino ester (aromatic) |
| ⓟ | $\phantom{-R^5-N=}R^6$ <br> $\phantom{-R^5-N=}|$ <br> $-R^5-N=C$ <br> $\phantom{-R^5-N=}|$ <br> $\phantom{-R^5-N=}R^7$ | Simple imine |
| ⓟ | $-R^5-NR^6-C=N-R^8$ <br> $\phantom{-R^5-NR^6-}|$ <br> $\phantom{-R^5-NR^6-}R^7$ | Amidine |
| ⓟ | $\phantom{-R^5-N=C}R^6$ <br> $\phantom{-R^5-N=C}\diagup$ <br> $-R^5-N=C$ <br> $\phantom{-R^5-N=C}\diagdown$ <br> $\phantom{-R^5-N=C}Ar'$ | Simple imine (aromatic) |

TABLE A-continued

| | TYPE | |
|---|---|---|
| ⓟ | $-R^5-NR^6-C=N-Ar'$ <br> $\phantom{-R^5-NR^6-}|$ <br> $\phantom{-R^5-NR^6-}R^7$ | Amidine (aromatic) |
| ⓟ | $-R^5-C=N-R^6$ <br> $\phantom{-R^5-}|$ <br> $\phantom{-R^5-}OR^7$ | Imino ester (aliphatic) |
| ⓟ | $-R^5-C=N-R^6$ <br> $\phantom{-R^5-}|$ <br> $\phantom{-R^5-}OAr'$ | Imino ester (aromatic) |
| ⓟ | $-R^5-NH-C=NR^6$ <br> $\phantom{-R^5-NH-}|$ <br> $\phantom{-R^5-NH-}NHR^6$ | Guanidine |
| ⓟ | $\phantom{-R^5-NR^7-C}NR^8$ <br> $\phantom{-R^5-NR^7-C}\diagup\diagup$ <br> $-R^5-NR^7-C$ <br> $\phantom{-R^5-NR^7-C}\diagdown$ <br> $\phantom{-R^5-NR^7-C}NR_2^8$ | Guanidine |
| ⓟ | $-R^5-NH-C=NAr'$ <br> $\phantom{-R^5-NH-}|$ <br> $\phantom{-R^5-NH-}NHAr'$ | Guanidine (aromatic) |
| ⓟ | $-R^5-O-C=N-R^6$ <br> $\phantom{-R^5-O-}|$ <br> $\phantom{-R^5-O-}NHR^6$ | Isourea |
| ⓟ | $-R^5-O-C=N-R^7$ <br> $\phantom{-R^5-O-}|$ <br> $\phantom{-R^5-O-}NH_2$ | Isourea | wherein:

$R^5$ and Ar are divalent aliphatic and aromatic organic linking groups, respectively;

ⓟ represents H or a polyether or hydrocarbon chain or radical, to which said imino (C=N) functional group is attached as indicated by the drawings.

$R^6$ is H or a monovalent organic aliphatic group of 1 to 10 carbons;

$R^7$ and $R^8$ are monovalent aliphatic organic groups of 1 to 10 carbon atoms, and Ar' is a monovalent aromatic organic group of 6 to 18 carbon atoms.

These stated groups are well known in the art. Thus $R^5$ may in particular be propylene, Ar methoxyphenylene, $R^6$ propyl, $R^7$ propyl, $R^8$ propyl and Ar' methoxyphenyl.

It is noted that in the above formulas any two of the three substituents attached to the imino unit can be incorporated as members of a non-aromatic 5 or 6 membered ring. The ring can be carbocyclic or heterocyclic depending, of course, on the particular substituents so incorporated and on whether the carbon or the nitrogen atom (or both) of the imino unit are also incorporated.

When aromatic groups are present in the imino unit it is preferable that they be attached to the carbon atom of said unit and it is most preferred that said aromatic-group bear electron donating substituents such as hydroxy, alkoxy N,N-dialkyl-amino etc.

The preparation of these imino functional groups in both cyclic and acyclic forms is well known in the literature.

Isoureas are generally prepared by the reaction of an alcohol with a carbodiimide in the presence of a suitable catalyst. The alcohol component may be aliphatic, as described in E. Schmidt, F. Moosmuller, Lieb. Ann. 597. 235, (1956), or aromatic as in E. Vowinkel, Chem.

Ber., 96, 1702, (1963). The catalyst employed in these reactions are frequently chloride salts of copper, such as the use of copper (I) chloride in E. Vowinkel, I. Buthe, Chem. Ber., 107, 1353, (1974), or copper (II) chloride, as in E. Schmidt, E. Dabritz, K. Thulke, Lieb. Ann., 685, 161, (1965).

However the reaction can also be carried out by the addition of an alkaline metal to the alcohol component as exemplified by the use of sodium metal in H. G. Khorana, Canad. J. Chem. 32, 261, 1953.

Guanidines can be prepared by the reaction of an amine with a carbodiimide in a manner similar to that outlined in the references cited above. Alternatively alkylguanidines may be prepared by the reaction of an alkylamine salt with dicyandiamide as in E. A.. Werner, J. Bell, J. Chem. Soc., 121, 1790, (1922). In yet another method s-methylthiourea sulphate is combined with an alkylamine as described in "Heterocyclic Chemistry", A. Albert, Althone Press, London, 1968.

A general review of the preparation of imidates is given in "The Chemistry of amidines and imidates", Ed. S. Patai, chapter 9, "Imidates including cyclic imidates", D. G. Neilson, John Wiley, London, 1975. This work includes references to the preparation of the analogous thioimidates.

The preparation of acyclic imidates by the combination of an aliphatic or aromatic nitrile with an alcohol under acidic or basic conditions is described in F. C. Schaefer, G. A. Peters, J. Org. Chem., 26, 412, (1961).

The preparation of cyclic imidates, such as oxazolines and dihydro-1,3-oxazines, by the Ritter reaction (addition of 1,3-diols or epoxides to a nitrile under acid catalysis) is described in "Advances in heterocyclic chemistry", Vol. 6, Ed. A. R. Katritzky, A. R. Boulton, Section II. A, "Heterocyclic synthesis involving nitrilium salts and nitriles under acidic conditions", F. Johnson, R. Madronero, Academic Press, New York, 1966 and references therein. In addition this text teaches the preparation of thioimidates such as thiazolines and dihydro-1,3-thiazines. Methods for the preparation of oxazolines and oxazines are also described in U.S. Pat. No. 3630996 to D. Tomalia, U.S. Pat. No. 3640957 to D. Tomalis and R. J. Thomas, in H. Witte, W. Seeliger, Angew. Chem. Int. Ed., 1972, 287 and in U.S. Pat. No. 3813378 to H. Witte and W. Seeliger.

A general review of the preparation of amidines is given in "The Chemistry of amidines and imidates", Ed. S. Patai, chapter 7, "Preparation and synthetic uses of amidines".

The general class of five membered ring amidines known as imidazolines can be prepared in a manner similar to that outlined above by the combination of a nitrile containing compound with ethylenediamine in the presence of an acid catalyst. Alternatively these materials can be prepared by the combination of ethylenediamine with carboxylic acids under dehydrating conditions. Other methods for the preparation of these materials include the combination of ethylenediamine with thioamides or with an imino ether hydrochloride. These procedures are described in "The Chemistry of Heterocyclic compounds : Imidazole and its Derivatives", Part I, Ed. A. Weissberger, author K. Hofman, Interscience publishers, New York, 1953 and references therein. Particularly useful for the preparation of imidazoline terminated softblocks from cyanoethylated polyether polyols would be the method outlined in U.S. Pat. No. 4006247 to H. P. Panzer.

The preparation of the homologous tetrahydropyrimidines can be achieved in a similar manner by the use of 1,3-propane-diamine as the diamine component. Specific methods are described in "The Chemistry of Heterocyclic Compounds : The Pyrimidines, Supplement I", Ed. A. Weissberger and E. C. Taylor, author D. J. Brown, Interscience Publishers, New York, 1953.

The preparation of an imine can be achieved by any of a number of well documented procedures. In particular these materials can be obtained by the combination of a primary amine with an aldehyde or a ketone under dehydrating conditions. This and numerous alternative methods are contained in "The Chemistry of the Carbon-Nitrogen Double Bond", Ed. S. Patai, Interscience Publishers, London, 1970 and references therein.

Examples of preferred imino-functional compounds include simple aldimines and ketimines such as may be obtained by reacting aldehydes, for example formaldehyde, acetaldehyde, propionaldehyde, n-butyraldehyde, isobutyraldehyde, heptaldehyde, alpha-methylvaleraldehyde, beta-methylvaleraldehyde, caproaldehyde, isocaproaldehyde, salicylaldehyde or cyclohexyl aldehyde and mixtures thereof, or ketones, for example acetone, methyl ethyl ketone, methyl n-propyl ketone, methyl isopropyl ketone, diethyl ketone, benzyl methyl ketone or cyclohexanone and mixtures thereof, with primary amines, especially aliphatic diamines including unsymmetrical diamines. Examples of suitable amines include hexamethylene diamine, menthane diamine, isophorone diamine, xylylene diamine, 2-methylpentamethylene diamine, polyoxyalkylene diamines and/or triamines having molecular weights up to about 600 and mixtures of such amines.

Enamine-containing compounds which may be used as reactant (b) in making the isocyanate-reactive compositions of the invention include compounds having the structures :

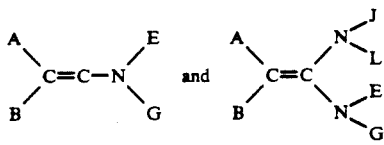

wherein each of A, B, D, E, G, J and L, independently, represents hydrogen or an optionally substituted organic radical, any of A, B and D and, independently, any of E, G, J and L optionally being joined together to form one or more carbocyclic or heterocyclic rings.

In preferred enamino-functional compounds, E, G, J and L are not hydrogen. Especially useful enaminofunctional compounds contain two or three enamino groups as a result of A or B being a radical terminating in one or more enamino groups. Mono-enamino functional compounds may be used also.

Suitable enamino-functional compounds may be obtained in known manner by reacting a carbonyl compound containing at least one alpha-hydrogen atom, for example an aliphatic, cyclo-aliphatic or araliphatic aldehyde or ketone such as acetaldehyde, propionaldehyde, isobutyraldehyde, caproaldehyde, cyclohexyl aldehyde, acetone, methyl ethyl ketone, benzyl methyl ketone, cyclopentanone, cyclohexanone, trimethylcyclohexanone, mixtures of these and the like with an aliphatic, cycloaliphatic, aromatic or heterocyclic secondary mono- or polyamine for example morpholine, piperazine or secondary amino-terminated low molecular weight polymers such as polyethers having molecular weights up to about 600.

General techniques for the synthesis of enamines have been described in, for example, Org. Coatings and Plastics Chem., 44, 151 and 157, (1981), ACS-PMSE preprints, August/September 1983, 456 and 461, and U.S. Pat. Nos. 4,342,841 and 4,552,945.

The polyfunctional compounds (b) used in the preparation of the isocyanate-reactive compositions of the invention will generally have molecular weights below 5000, typically below 2000 and especially below 1000, for example below 600, and often below 300.

The isocyanate-reactive compositions of the invention may be formed by reacting reactant (a) with reactant (b) at ambient or elevated temperatures, optionally in the presence of an inert solvent and optionally in the presence of an acid acceptor. It is preferred to use a stoichiometric excess of the polyfunctional compound, that is to say more than one mole per equivalent of reactant (a). The unreacted polyfunctional compound may be removed at the end of the reaction by low pressure distillation, for example in a thin film evaporator or, alternatively, it may be allowed to remain in the isocyanate-reactive composition to function as a chain extender in subsequent reactions with organic polyisocyanates.

The isocyanate-reactive compositions of the invention may in particular be prepared by the controlled addition of reactant (a), optionally dissolved in a suitable inert solvent, to an appropriate reactant (b), optionally dissolved in a similar inert solvent. Reaction will generally proceed at or close to room temperature but temperatures in the range $-15°$ to about $100°$ C. may be employed if necessary to achieve a more controlled reaction.

Undesirable violent exotherms should be prevented by slow combination of the reactants, with additional cooling if required. The hydrogen chloride formed as a by-product can be removed by sparging the reaction product with dry nitrogen. Hydrogen chloride may be removed in different ways like neutralisation with tertiary amines, or an aqueous solution of inorganic bases, followed by separating the solid amine hydrochloride or the aqueous salt solution. Other neutralizing agents which may be used are silyl-amines like N,N-diethylaminotrimethylsilane or alkanolamines like triethanolamine and N,N,N'N'-tetrakis-(2-hydroxypropyl)-ethylene diamine. The silyl-amines convert HCl into volatile products which may be separated by simple distillation, while the alkanolamines mentioned above form with HCl readily separable precipitates. The silyl-amines or the alkanolamines may be applied during and/or after the HCl-forming reaction. Optionally the hydrochloride may be left in the product. Solvents can be removed from the reaction product by distillation, preferably under reduced pressure. Solvents are not needed when the above mentioned silylamine and alkanolamines are used to remove the HCl.

If desired, the isocyanate-reactive compositions of the invention may be blended with or employed in conjunction with other isocyanate-reactive materials which may be of the types which find use as chain extenders or crosslinkers having molecular weights of, for example, from about 60 to about 1500 or they may be of the types which have been proposed as softblock components having molecular weights of, for example, from about 1500 to about 8000.

Low molecular weight isocyanate-reactive compounds which may be mixed with the compositions of the invention preferably have molecular weights below 500 and include glycols, for example ethylene glycol and 1,4-butanediol, alkanolamines, for example ethanolamine, diethanolamine, triethanolamine and tri-isopropanolamine and aromatic polyamines. Useful aromatic polyamines particularly include diamines, especially those having molecular weights between 122 and 300. Suitable diamines have been fully described in the prior art and include 3,5-diethyl-2,4-toluenediamine, 3,5-diethyl-2,6-toluenediamine, DETDA which is a mixture of about 80 % by weight of 3,5-diethyl-2,4-toluenediamine and about 20 % by weight of 3,5-diethyl-2,6-toluenediamine, 1,3,5-triethyl-2,6-diaminobenzene, 2,4-diaminotoluene, 2,6-diaminotoluene, 2,4'-diaminodiphenylmethane, 4,4'-diamino-diphenylmethane, 3,3'-diaminodiphenylmethane, 4,4'-diaminodiphenylmethane, 3,3',5,5'-tetraisopropyl 4,4'-diaminodiphenylmethane and the like and mixtures thereof.

Higher molecular weight isocyanate-reactive compounds which may be mixed with the compositions of the invention include polymeric polyols, for example those described above with reference to the production of reactant (a), especially the polyether and polyester polyols. Other higher molecular weight isocyanate-reactive compounds useful for mixing with the compositions of the invention include polymeric polyamines, especially diamines and triamines, corresponding to the above described polymeric polyols. Suitable polyamines include products obtained by the reductive amination of polyether polyols as described, for example, in U.S. Pat. No. 3,654,370 or by the cyanoethylation of polyols followed by hydrogenation.

Polyoxypropylene diamines and triamines and mixtures thereof are preferred. Also useful are polymers containing both amino and hydroxyl groups obtained by the partial amination of polyols. Other suitable polyamines include amino functional polysiloxanes, amine terminated polyamides, amine terminated hydrocarbon polyols, etc.

Other isocyanate-reactive materials which may be mixed with the compositions of the invention to form useful isocyanate-reactive blends include other low or high molecular weight imino- or enamino-functional materials.

The isocyanate-reactive compositions and blends of the invention may be reacted with organic polyisocyanates using techniques and items of processing equipment that have been fully described in the prior art to form useful polymeric materials, for example polyurethanes or polyureas which may take any of the known forms, for example adhesives, coatings, elastomers, fibres, films, foams or thermo-plastics. Furthermore, polyisocyanurate modification may be introduced into said polymers by appropriate use of excess polyisocyanate and trimerisation catalysts.

Organic polyisocyanates which may reacted with the isocyanatereactive compositions and blends of the invention include aliphatic, cycloaliphatic and araliphatic polyisocyanates, for example hexamethylene diisocyanate, isophorone diisocyanate, cyclohexane-1,4-diisocyanate, dicyclohexylmethane-4,4'-di-isocyanate and p-xylylene diisocyanate. The preferred polyisocyanates, however, are the aromatic polyisocyanates, for example phenylene diisocyanates, tolylene diisocyanates, 1,5-naphthylene diisocyanate and especially the available MDI isomers, that is to say 4,4'-diphenylmethane diisocyanate, 2,4'-diphenylmethane diisocyanate and mixtures thereof.

Whilst diisocyanates are the preferred polyisocyanates for most purposes, for example for the preparation of elastomers, mixtures of diisocyanates with higher functionality polyisocyanates may be used if desired. Such mixtures include polymethylene polyphenyl polyisocyanates (crude MDI). Mention may also be made of polyisocyanates (especially MDI) which have been modified by the introduction of urethane, allophanate, urea, biuret, carbodiimide, uretonimine or isocyanurate residues.

Particularly useful polyisocyanates include liquid prepolymers containing both urethane and urea residues obtained by reacting a stoichiometric excess of an organic polyisocyanate, especially MDI, with :

(i) a polymeric polyol having a hydroxyl functionality of 2 to 4 and a hydroxyl equivalent weight of 500 to 5000, especially 800 to 2000, and (ii) a polymeric polyamine having a primary and/or secondary amino functionality of 2 to 3 and an amine equivalent weight of 500 to 5000, especially 800 to 2000.

Reaction between the organic polyisocyanate and the composition or blend of the invention may be performed in the presence of reactive or non-reactive additives already described for use in polyurethane, polyurea or polyisocyanurate processes. In addition to the chain extenders, crosslinkers and the like already mentioned, such additives include blowing agents, catalysts, surfactants, foam stabilisers, cell openers, fire retardants, fillers, dyes, pigments and internal mould release agents.

Blowing agents which may be used include water and inert volatile liquids which vaporise under the influence of the exothermic reaction, such liquids typically having boiling points not exceeding 100° C., preferably not exceeding 50° C., at atmospheric pressure.

Catalysts which may be used include tertiary amines such as 1,4-diazabicyclo(2.2.2)octane, N,N-dimethylethanolamine, bis(2-dimethylaminoethyl) ether, N-ethylmorpholine and N,N'-diethylpiperazine and tin compounds such as stannous octoate and dibutyltin dilaurate. Trimerisation catalysts include alkali metal salts of alkanoic acids and certain tertiary amines such as tris(-dialkylaminoalkyl)-hexahydrotriazines and tris(dialkylaminoalkyl)phenols.

Surfactants and foam stabilisers which may be used include oxyethylated alkylphenols, ethylene oxide-propylene oxide block copolymers and siloxane-oxyalkylene copolymers.

Fire retardants may be of the isocyanate-reactive or non-reactive types and fillers may be organic or inorganic, particulate or fibrous.

In formulating reaction systems comprising :

A) an organic polyisocyanate;

B) an isocyanate-reactive component comprising an isocyanate-reactive composition or blend of the invention and, C) one or more of the additives known per se in polyurethane, polyurea or polyisocyanurate processes, some of the individual components may be pre-blended if desired so as to reduce the number of component streams requiring to be brought together in the final mixing step. It is generally most convenient to formulate a two-stream system whereby one stream comprises the polyisocyanate and the second stream comprises the isocyanate-reactive materials. Inert additives are commonly included in the isocyanate-reactive stream but can often be incorporated with the polyisocyanate.

The isocyanate-reactive compositions of the invention can be of particular value in the production of moulded elastomers by the reaction injection moulding (RIM) technique whereby a polyisocyanate stream and an isocyanate-reactive stream are impingement mixed and rapidly injected into a mould cavity. The isocyanate-reactive stream may advantageously contain an aromatic polyamine, for example the diamines mentioned above, as chain extender in addition to an isocyanate-reactive composition of the invention. Any of the RIM techniques and equipment described in the prior art for example in the aforementioned U.S. Pat. No. 4,794,129, may be used.

If desired, the compositions of the invention may be reacted with an excess of organic polyisocyanate to form polyisocyanate compositions (prepolymers) which may then be used in RIM or other processes.

In order to facilitate mixing with polyisocyanates, it is preferred that the isocyanate-reactive compositions of the invention are liquids at normal ambient temperatures having viscosities below 5000 centipoises, more preferably below 4000 centipoises and most preferably below 2500 centipoises at 25° C.

The invention is illustrated but not limited by the following Examples :

EXAMPLE 1

A polyoxypropylene triol of molecular weight 5000 was first dried and degassed by standing over 4A molecular sieves in a vacuum oven at 35° C. overnight. The dried polyol (608.4 g, 0.116 moles) was transferred to a two litre three-necked round bottomed flask fitted with a mechanical stirrer, a dry ice cold finger, a gas addition tube and a nitrogen sparge tube. Phosgene (68.0 g, 0.687 moles) was carefully introduced into the stirred polyol at room temperature. After the phosgene addition was complete, the stirred reaction mixture was slowly heated to 70° C. The reaction was held at this temperature for approximately two hours after which time analysis by infra red spectroscopy showed that all of the polyol had been converted to the required chloroformate. The cold finger was then detached and hydrochloric acid formed during reaction and excess phosgene were removed by sparging with dry nitrogen. The last traces of volatiles were removed by allowing the product to stand in a vacuum oven at 60° C. overnight. The product was used in the subsequent step without intermediate purification.

50 gram of the polyether chloroformate was slowly added via a dropping funnel to a vigorously stirred mixture of 100 g of the cyclohexanone bis-imine of Jeffamine D400 and 3.7 g triethylamine. An exotherm and the formation of a white precipitate was noted during the addition at room temperature. The mixture was allowed to stir for a further hour after the addition of the chloroformate was complete. Cyclohexane solvent (50 g) was added and the mixture was filtered to remove triethylammonium chloride formed during the reaction. The solvent was then removed in vacuo to give a clear mobile resin having a viscosity of 940 cps at 23° C.

EXAMPLE 2

Applying the method described in Example 1, but using 50 g of the cyclohexanone bis-imine of Jeffamine D400, a resin was prepared having a viscosity of 1720 cps at 23° C.

EXAMPLE 3

Applying the method described in Example 1, but using 25 g of the cyclohexanone bis-imine of Jeffamine D400, a resin was prepared having a viscosity of 2460 cps at 23° C.

EXAMPLE 4

Applying the general method described in Example 1, 50 g of the polyether chloroformate was reacted with a mixture of 15 g of the cyclohexanone bis-imine of 2-methylpentane diamine (Dytek A from DUPONT) and 3.7 g triethylamine dissolved in 50 g cyclohexane solvent. A resin was obtained having a viscosity of 1400 cps at 23° C.

EXAMPLE 5

Applying the method described in Example 4, but using 15 g of the methylisobutylketone bis-imine of 2-methylpentanediamine (Dytek A from DUPONT) a resin was prepared having a viscosity of 3060 cp at 23° C.

EXAMPLE 6

Using the general method described in Example 1, a polyether chloroformate was made by reacting the polyether triol described in Example 1 with a 20 % excess of phosgene. The product, after sparging with nitrogen, had an -OCOCl content of 4.60 % by weight.

An isocyanate-reactive composition according to the invention was prepared by reacting the polyether chloro-formate with N-methyl-N'(2-methylpent-4-ylidine)-propylene-diamine (an amino-imine obtained by reacting methyl isobutyl ketone with N-methylpropylenediamine). Reaction between the chloroformate and the amino-imine was carried out in accordance with the following procedure :

The amino-imine (209 g, 1.25 moles), cyclohexane (6620 g) and triethylamine (125.3 g, 1.24 moles) were charged to a 20 l Buchi Chemreactor and stirred at 8670 rpm under a nitrogen blanket. By means of a well calibrated peristaltic pump, a solution of the chloroformate (2205 g, 1.223 moles) in cyclohexane (2205 g) was added to the amino-imine over a period of 60 minutes. The resulting reaction mixture was stirred for a further 30 minutes at which point 10 % aqueous sodium hydroxide solution (I100 g) was added. After stirring for an additional period, agitation was ceased and the aqueous and organic layers were allowed to separate. The upper organic layer was subsequently washed a second time in the same manner. The solvent and residual water were then removed from the product by reduced pressure distillation at 45° C. and 30–50 mbar pressure.

The resulting milky white product had an amine value of 0.437 mmol/g and a viscosity of 1900 cP at 25° C.

EXAMPLE 7

Elastomers were prepared from formulations containing an isocyanate-terminated prepolymer, in imine-terminated isocyanate-reactive material and DETDA.

The prepolymer had an NCO content of 15.4 % and was the product of reacting 44.26 parts by weight of an 80/20 mixture of 4,4'-and 2,4'diphenylmethane diisocyanates, 10.0 parts by weight of a uretonimine-modified variant of pure 4,4'-diphenylmethane diisocyanate having an NCO content of 29.1 %, 22.87 parts by weight of a ethylene oxide capped polyoxypropylene triol having an ethylene oxide content of approximately 15 % by weight and a molecular weight of 5250 and 22.87 parts by weight of a polyoxypropylene diamine having a molecular weight of 2000, commercially available from Texaco Chemical Corporation as Jeffamine D-2000.

The isocyanate-reactive materials used in making the elastomers were two isocyanate-reactive compositions in accordance with the invention and, for the purpose of comparison, a polyether-imine of the type described in U.S. Pat. No. 4,794,129. Further details of these materials are as follows :

Polyether-imine. This was a tri-imine obtained by reacting cyclohexanone with Jeffamine T-5000 (a polyoxypropylene triamine having a molecular weight of 5000).

Composition 1. This was the composition of which the preparation is described in Example 6.

Composition 2. This was a composition obtained by reacting the polyether chloroformate described in Example 6 with an excess of the cyclohexanone bis-imine of 2-methylpentane diamine. The composition contained 90.8 parts by weight of chloroformate/imine reaction product and 9.2 parts by weight of free bis-imine.

The formulations were processed using the RIM technique. The prepolymer and isocyanate-reactive streams were injected at a temperature of 40°–45° C. and a pressure of 200 bar. RIM plaques were prepared as flat test sheets of dimensions 29.5 cm×29.5 cm×0.3 cm, the plaques being post-cured at 160° C. for 30 minutes within 24 hours of preparation.

Formulation details and elastomer properties are given in the following Tables.

TABLE 1

| SYSTEM | G1 | G2 | S1 | S2 |
|---|---|---|---|---|
| Prepolymer (pbw) | 60.7 | 62.8 | 60.4 | 62.6 |
| RESIN COMPOSITION: | | | | |
| Polyether-imine (pbw) | 21.6 | 20.5 | — | — |
| Composition 1 (pbw) | — | — | 21.8 | 20.6 |
| DETDA (pbw) | 17.7 | 16.7 | 17.8 | 16.8 |
| ISOCYANATE INDEX | 105 | 115 | 105 | 115 |
| HARDBLOCK CONTENT (%) | 51 | 51 | 51 | 51 |
| FLEXURAL MODULUS (MPa) | 658 | 660 | 865 | 803 |
| TENSILE STRENGTH (MPa) | 24.7 | 26.1 | 31.6 | 32.1 |
| ELONGATION (%) | 89 | 76 | 56 | 71 |
| HEAT SAG (mm) (150 mm O/H, 160° C., 60 min.) | 20 | 8.5 | 8 | 7 |
| ROOM TEMP. IMPACT (J) (FALLING DART) | 59 | 52 | 39 | 47 |
| −20° C. IMPACT (J) (FALLING DART) | 58 | 50 | 27 | 26 |
| DENSITY | 1127 | 1132 | 1111 | 1110 |
| HARDNESS (SHORE D) | 66 | 66 | 72 | 71 |

System G1 and G2 are included for the sake of comparison and do not represent the invention.

TABLE 2

| SYSTEM | S3 | S4 | S5 | S6 |
|---|---|---|---|---|
| Prepolymer (pbw) | 58.5 | 59.5 | 60.7 | 63.1 |
| RESIN COMPOSITION: | | | | |
| Composition 2 (pbw) | 25.9 | 24.6 | 22.8 | 19.2 |
| DETDA (pbw) | 15.6 | 15.9 | 16.5 | 17.7 |
| ISOCYANATE INDEX | 105 | 105 | 105 | 105 |
| HARDBLOCK CONTENT (%) | 50 | 51 | 52 | 54 |
| FLEXURAL MODULUS (MPa) | 657 | 708 | 708 | 661 |
| TENSILE STRENGTH (MPa) | 25.4 | 24.3 | 26.9 | 27.4 |
| HEAT SAG (mm) (150 mm O/H, 160° C., 60 min.) | 31 | 22 | 12 | 10 |
| ROOM TEMP. IMPACT (J) | 49 | 50 | 52 | 35 |

TABLE 2-continued

| SYSTEM | S3 | S4 | S5 | S6 |
|---|---|---|---|---|
| (FALLING DART) | | | | |
| −20° C. IMPACT (J) | 31 | 35 | 35 | 25 |
| (FALLING DART) | | | | |
| DENSITY (kg/m$^3$) | 1113 | 1114 | 1112 | 1104 |
| HARDNESS (SHORE D) | 65 | 66 | 66 | 62 |
| ELONGATION (%) | 19 | 18 | 19 | 14 |

TABLE 3

| SYSTEM | S7 | S8 | S9 | S10 |
|---|---|---|---|---|
| Prepolymer (pbw) | 60.7 | 61.6 | 62.8 | 65.2 |
| RESIN COMPOSITION: | | | | |
| Composition 2 (pbw) | 24.6 | 23.2 | 21.6 | 18.1 |
| DETDA (pbw) | 14.7 | 15.2 | 15.6 | 16.7 |
| ISOCYANATE INDEX | 115 | 115 | 115 | 115 |
| HARDBLOCK CONTENT (%) | 50 | 51 | 52 | 54 |
| FLEXURAL MODULUS (MPa) | 622 | 657 | 656 | 635 |
| TENSILE STRENGTH (MPa) | 25.6 | 26.2 | 26.6 | 28.2 |
| HEAT SAG (mm) | 16 | 17 | 14 | 9 |
| (150 mm O/H, 160° C., 60 min.) | | | | |
| ROOM TEMP. IMPACT (J) | 54 | 60 | 46 | 59 |
| (FALLING DART) | | | | |
| −20° C. IMPACT (J) | 48 | 55 | 45 | 41 |
| (FALLING DART) | | | | |
| DENSITY (kg/m$^3$) | 1119 | 1114 | 1114 | 1117 |
| HARDNESS (SHORE D) | 66 | 67 | 66 | 66 |

EXAMPLE 8

An amino group-terminated isocyanate-reactive composition was prepared by the hydrolysis of an imine-terminated composition using the following procedure:

An aliquot of 9 grams of water was added to 40 grams of the reaction product described in Example 6. This mixture was placed in a 250 ml pear shaped flask which was rotated on a Buchii Rotavapour at atmospheric pressure and 40° C. for 720 minutes. After this time the excess water and evolved cyclohexanone were removed under reduced pressure. The resulting product had an amine value of 0.468 mmoles/g but on analysis by infrared spectroscopy no absorbtion corresponding to an imine group was observed. This was confirmed by N.M.R. where the product exhibited a resonance at 154 ppm corresponding to the urethane linkage but no absorbtion in the region 160–170 ppm where the imine would be expected to be observed.

EXAMPLE 9

A tris-chloroformate of a polyoxypropylene triol (LHT-42 from Union Carbide) having a molecular weight of 4000 was prepared as in Example 1 except that the weight ratio of the triol to phosgene was adjusted such that the molar ratio remained the same as in Example 1. To 100 g of this polyether chloroformate a mixture of 12.8 g of the imine obtained by reacting methylisobutylketone (4-methyl-2-pentanone) and N-methyl-1,3-propanediamine, and 11.2 g of triethanolamine was added rapidly while rapidly stirring in an N$_2$ atmosphere. Stirring was continued for 1 hour at room temperature. Solids were allowed to settle and the liquid imine product was poured off. Infra-red analysis confirmed that a polyether imine was obtained.

EXAMPLE 10

Example 9 was repeated with 7.3 g of Multranol 4050, obtainable from Mobay, instead of 11.2 g of triethanolamine. Infra-red analysis confirmed that a polyether imine was obtained.

EXAMPLE 11

A mixture of 51.2 g of the imine obtained by reacting methylisobutylketone and N-methyl-1,3-propanediamine and 136.8 g of N,N-diethylamino-trimethylsilane was added rapidly under rapid stirring to 400 g of the polyether chloroformate made according to example 9. Subsequently this mixture was stirred for 10 minutes and heated slowly over a period of 30 minutes to 100° C. Then the mixture was purged vigorously with N$_2$ for 10 minutes at 100° C. while stirring. Subsequently vacuum was applied at 100° C. until evidence of gas evolution stopped. Infra-red analysis confirmed that the remaining clear-liquid product was a polyether imine. This product was free of solids.

EXAMPLE 12

1. Preparation of polyether-phenylcarbonate 400 g of polyol LHT-42, obtainable from Union Carbide was degassed. To ¼ of the above amount 65 g of diphenylcarbonate was added. Next 0.9 g of Polycat DBU, a catalyst available from Air Products, was added to the portion containing the diphenylcarbonate. Then the mixture was heated to 150° C. and held at that temperature for 30 minutes. Then the remainder of the polyol, which was preheated at 120° C., was rapidly added to the mixture. This combination was then heated to 150° C. and held at that temperature for 30 minutes. Subsequently vacuum was applied for 90 minutes at 170° C. The obtaining of the polyether-phenylcarbonate was confirmed by infra-red analysis.

2. Preparation of imine 150 g of the obtained polyether-phenylcarbonate, 21.5 g of the imine obtained by reacting methylisobutylketone and 2-(2-aminoethoxy)ethanol, 0.2 g of DBU, 0.2 g of 1,2-dimethylimidazole and 0.1 g of UL.Z8 catalyst, obtainable from Witco, were combined and stirred for 3 hours at 140° C. under N$_2$ atmosphere, followed by stirring at 150° C. for 30 minutes under N$_2$ atmosphere and then stirring at 150° C. for 80 minutes under vacuum. Infra-red analysis confirmed that the imine-terminated polyether carbonate product was obtained, and was free of phenol.

EXAMPLE 13

0.2 g of imidazole was added to 109.0 g of the polyetherphenylcarbonate, obtained as in the previous example, followed by heating to 90° C. Then 16 g of the imine, obtained by reacting methylisobutylketone and N-methyl-1,3-propanediamine, was added, followed by heating at 150° C. for 2 hours under full vacuum. Infra-red analysis confirmed that the imine-terminated polyether urethane product was obtained, and that it did not contain phenol.

EXAMPLE 14

1. Preparation of the imine obtained by reacting methyl isobutylketone and N-methyl-1,3-propanediamine 521.6 g of N-methyl-1,3-propanediamine and 801.3 g of methylisobutylketone were combined and then the reaction mixture was heated to reflux through a Dean-Stark trap at 120°–130° C. for 210 minutes after which time 111 ml. of water had been collected together with 121 ml of methylisobutylketone (MIBK). The resulting crude product was then distilled under vacuum to give a distillate having a boiling point of 52°–65° C. at about 76.2 cm Hg pressure. Infra-red analysis confirmed that the remaining reaction product (pot-residue or bottoms) was the MIBK imine of N-methyl-1,3-propanediamine. This remaining reaction product was used in some of the previous examples.

2. Preparation of the imine obtained by reacting methyl-isobutylketone and 2-(2-aminoethoxy)-ethanol 1410.8 g of 2-(2-aminoethoxy)-ethanol and 1822.3 g of methylisobutylketone were combined. Then the reaction mixture was heated to reflux (120°-130° C.) until no more water was distilled off (collected in a Dean-Stark trap). Then the reaction mixture was stirred under vacuum at room temperature until boiling ceased, in order to remove excess methylisobutylketone. Subsequently 1000 g more methylisobutylketone was added to the pot residue followed by 2 hours refluxing. Finally the excess methylisobutylketone was removed at room temperature, by stirring under vacuum until boiling stopped. The final pot residue was the product. Its structure was confirmed by infra-red spectroscopy. This product was free of residual ketone.

We claim:

1. An isocyanate-reactive composition comprising the reaction product of :
   (a) an organic compound having the formula :

$$Q-[X-COY]_n$$

or $$Q-[X-CO-R-(COY)_m]_n$$

wherein Q represents an organic residue, X represents oxygen or sulphur, Y represents a halogen atom or an aryloxy group, R is a polyvalent hydrocarbon radical, m is a whole number from 1 to 3 and n is a whole number of at least 2, and
   (b) a polyfunctional compound which is capable of reacting with reactant (a) and contains at least one imino or enamino group.

2. An isocyanate-reactive composition according to claim 1 wherein reactant (a) is the reaction product of a polyol or polythiol having an average hydroxyl and/or thiol functionality of from about 1.5 to about 6 and an average molecular weight of from about 100 to about 12,000 and an acylating agent of the formula :

$$COY_2$$

or $$R-(COY)_{m+1}$$

wherein Y, R and m have the meaning given in claim 1.

3. An isocyanate-reactive composition according to claim 2 wherein the polyol or polythiol has an average hydroxyl and/or thiol functionality of from 2 to 4 and has an average molecular weight of from about 1500 to about 8000.

4. An isocyanate-reactive composition according to claim 2 wherein the polyol is a polyoxypropylene polyol.

5. An isocyanate-reactive composition according to claim 2 wherein the acylating agent is phosgene or a dicarboxylic acid chloride having a boiling point not exceeding 350° C. at atmospheric pressure.

6. An isocyanate-reactive composition according to claim 1 wherein reactant (b) contains two or more functional groups per molecule selected from hydroxyl, thiol, primary amino, secondary amino, carboxy, imino and enamino groups, at least one of said functional groups being an imino or enamino group.

7. An isocyanate-reactive composition according to claim 1 wherein reactant (b) contains at least one imino or enamino group, and at least one primary or secondary amino group.

8. An isocyanate-reactive composition according to claim 1 wherein reactant (b) has a molecular weight below 600.

9. An isocyanate-reactive composition according to claim 2 wherein reactant (a) is a poly-(chloroformate) and reactant (b) contains two groups, one of which is selected from amino, imino and enamino groups, the other being selected from imino and enamino groups.

10. An isocyanate-reactive blend comprising :
    (i) an isocyanate-reactive composition according to claim 1, and
    (ii) an isocyanate-reactive compound having a molecular weight below 400 selected from glycols, alkanolamines, aromatic polyamines, imino-functional compounds and enamine containing compounds.

11. A polymeric material obtained by reacting an organic polyisocyanate with a component comprising an isocyanate-reactive composition according to claim 1.

12. A polyamine obtainable by the hydrolysis of the reaction product of :
    (a) an organic compound having the formula :

$$Q-[X-COY]_n$$

or $$Q-[X-CO-R-(COY)_m]_n$$

wherein Q represents an organic residue, X represents oxygen or sulphur, Y represents a halogen atom or an aryloxy group, R is a polyvalent hydrocarbon radical, m is a whole number from 1 to 3 and n is a whole number of at least 2, and
    (b) a polyfunctional compound containing an amine group and at least one hydrolysable imino group.

13. An isocyanate-reactive composition according to claim 1 wherein Y represents an aryloxy group.

* * * * *